United States Patent
Nishimura

(10) Patent No.: US 6,627,270 B1
(45) Date of Patent: *Sep. 30, 2003

(54) LIQUID CRYSTALLINE FILM

(75) Inventor: Suzushi Nishimura, Tokyo (JP)

(73) Assignee: Nippon Mitsubishi Oil Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/673,902

(22) PCT Filed: Apr. 23, 1999

(86) PCT No.: PCT/JP99/02176
§ 371 (c)(1),
(2), (4) Date: Oct. 23, 2000

(87) PCT Pub. No.: WO99/54388
PCT Pub. Date: Oct. 28, 1999

(30) Foreign Application Priority Data

Apr. 23, 1998 (JP) ............................ 10-113418
May 21, 1998 (JP) ............................ 10-139832

(51) Int. Cl.$^7$ .............................. C09K 19/52; G02F 1/13
(52) U.S. Cl. .................... 428/1.3; 252/299.01; 428/1.1; 349/201
(58) Field of Search ............................ 428/1.1, 1.2, 1.3; 252/299.01; 349/201

(56) References Cited

U.S. PATENT DOCUMENTS

| 4,652,626 | A | * | 3/1987 | Orii et al. ................... 528/194 |
| 4,746,722 | A | * | 5/1988 | Iida et al. ................... 528/194 |
| 5,081,221 | A | * | 1/1992 | Watanabe et al. ........... 528/308 |
| 5,093,025 | A | * | 3/1992 | Koide et al. ........... 252/299.01 |
| 6,108,064 | A | * | 8/2000 | Minoura et al. ............. 349/130 |
| 6,537,624 | B1 | * | 3/2003 | Suzuki et al. ................ 428/1.3 |

FOREIGN PATENT DOCUMENTS

| EP | 1045260 | * | 10/2000 |
| WO | WO99/34242 | * | 7/1999 |

* cited by examiner

Primary Examiner—Shean C. Wu
(74) Attorney, Agent, or Firm—Scully, Scott, Murphy & Presser

(57) ABSTRACT

A liquid crystalline film which functions suitably as a polarization rotating lattice is provided. The liquid crystalline film is characterized in that a cholesteric orientation or a chiral smectic C orientation, in which helical axis is not uniformly parallel in the thickness direction of the film nor is helix pitch of helices uniformly equal in the film thickness direction, is formed in a certain region of the film.

7 Claims, No Drawings

LIQUID CRYSTALLINE FILM

FIELD OF THE INVENTION

The present invention relates to a new liquid crystalline film capable of generating a diffracted light having polarizability.

BACKGROUND OF THE INVENTION

Diffraction gratings are general-purpose optical elements which are in wide use for example in the field of spectro-optics for the purpose of spectralization or flux division. Diffraction gratings are classified into several types according to shapes thereof, usually classified into amplification type diffraction gratings wherein a light transmitting portion and a non-light transmitting portion are arranged in a periodical manner and phase type diffraction gratings wherein periodic grooves are formed in a material of a high transmittance. There also is a case where there are classified into transmission type diffraction gratings and reflection type diffraction gratings according to directions in which diffracted light is generated (Tetsuo Sueda, "How to use Optical Components and Points to be Noted," Optronics Co., ISBN4-900474-03-7).

In the above conventional diffraction gratings, there can be obtained only a non-polarized light as a diffracted light obtained upon incidence of a natural light (non-polarized light). In such a polarization optical device as an ellipsometer which is often used in the field of spectro-optics, there can be obtained only a non-polarized light as a diffracted light, so when a natural light emitted from a light source is to be spectralized through a diffraction grating or when only a specific polarization component contained therein is to be utilized, there usually is adopted a method wherein the diffracted light is passed through a polarizer and is then used. However, this method involves a problem such that the quantity of light is reduced by half because about 50% or more of the resulting diffracted light is absorbed by the polarizer. Besides, it is necessary to provide a detector of a high sensitivity and a light source capable of emitting a large quantity of light. Thus, it has been demanded to develop a diffraction grating whereby a diffracted light itself is made into such a specific polarized light as a circularly polarized light or a linearly polarized light.

OBJECTS OF THE INVENTION

It is an object of the present invention to solve the above-mentioned problems and provide a liquid crystalline film which functions suitably as a polarization/diffraction grating, as well as an optical element using the liquid crystalline film.

According to the present invention, by precisely controlling the state of orientation of liquid crystal molecules, a region of a high diffraction efficiency can be formed in a cholesteric liquid crystal layer or in a chiral smectic C liquid crystal layer. More particularly, according to the present invention, a liquid crystalline film which functions suitably as a polarization/diffraction grating can be obtained by controlling and fixing a cholesteric orientation or a chiral smectic C orientation in which the helical axis in cholesteric or chiral smectic C phase is not uniformly parallel in the film thickness direction nor is the helix pitch uniformly equal in the film thickness direction.

SUMMARY OF THE INVENTION

The present invention firstly resides in a liquid crystalline film in which a cholesteric orientation or a chiral smectic C orientation, in which helical axis is not uniformly parallel in the film thickness direction nor is the helix pitch uniformly equal in the film thickness direction, is formed in a certain region of the film.

The present invention secondly resides in the above liquid crystalline film, wherein the above cholesteric orientation or chiral smectic C orientation is formed in a surface region of the film and/or an interior region of the film.

The present invention thirdly resides in a process for fabricating the liquid crystalline film referred to firstly above, wherein a diffraction pattern is transferred to a liquid crystal layer to obtain the liquid crystalline film.

The present invention fourthly resides in a process for fabricating the liquid crystalline film referred to thirdly above, wherein the liquid crystal layer is a liquid crystalline polymer layer.

The present invention fifthly resides in the liquid crystalline film fabricating method referred to fourthly above, wherein the diffraction pattern is transferred to the liquid crystalline polymer layer in a temperature range of above a glass transition point of the liquid crystal and below an isotropic phase transition temperature of the liquid crystal and in a pressure range of 0.3 to 500 $kgf/cm^2$.

The present invention sixthly resides in an optical element, wherein the liquid crystalline film referred to firstly above is laminated to an optical member through an adhesive free of any difference in refractive index.

The present invention seventhly resides in an optical element obtained by transferring a diffraction pattern to a surface of a liquid crystal layer in the liquid crystalline film referred to firstly above to make the surface uneven in accordance with the diffraction pattern and by subsequently leveling the uneven surface with use of an adhesive free of any difference in refractive index.

DETAILED DESCRIPTION OF THE INVENTION

The present invention will be described in detail hereinunder.

The liquid crystalline film of the present invention has a unique structure of a liquid crystal layer. More specifically, in at least a partial region of the film there is formed an orientation wherein the helical axis is not uniformly parallel in the film thickness direction nor is the helix pitch uniformly equal in the film thickness direction. As an example of such a liquid crystalline film there is mentioned one wherein when a screw axis structure in an ordinary cholesteric orientation or chiral smectic C orientation is regarded as a pseudo-layer structure, part of the layer structure is oriented in a regularly curved or bent state. But the present invention is not limited thereto, nor is limited means for forming such a structure.

The region where such a unique liquid crystal layer structure is formed may be any region in the film; for example, it may be a part of the film surface (a film surface region) or a part of the film interior (a film interior region). The region in question may be plural regions in the liquid crystalline film, e.g., surface and back regions of the film or plural film interior regions. It is not always necessary that the film in question be formed as a layer having a uniform thickness at the film surface or in the interior of the film. It suffices for the region to be formed at least partially of the film surface or the film interior. The region may be in a desired shape. In the case where the region having a cholesteric or chiral smectic C orientation with the helical axis being not uniformly parallel in the film thickness direction nor being the helix pitch uniformly equal in the film thickness direction is present as layer in the liquid crystalline film of the present invention, it is desirable for the layer to have a thickness usually of 50% or less, preferably 30% or less, more preferably 10% or less, relative to the thickness of the liquid crystalline film. If the thickness of the region in question exceeds 50% of the film thickness, such effects as selective reflection characteristic and circular polarization characteristic based on cholesteric liquid crystal phase or chiral smectic C liquid crystal phase will be deteriorated and it may become impossible to attain the effect of the present invention.

In the case where there are plural regions in each of which is formed a cholesteric or chiral smectic C orientation with the helical axis being not uniformly parallel in the film thickness direction nor being the helix pitch uniformly equal in the film thickness direction, it is not necessary for all of the regions to have the same liquid crystal phase structure, but plural regions may have different structures respectively. In the other region of the liquid crystalline film of the invention than the region where there is formed such a cholesteric or chiral smectic C orientation it is desirable that there be formed an ordinary cholesteric or chiral smectic C orientation wherein the helical axis is uniformly parallel in the film thickness direction and the helix pitch is uniformly equal in the film thickness direction.

The liquid crystalline film having the specific crystal layer structure according to the present invention can be obtained by forming a liquid crystalline polymer film wherein a cholesteric or chiral smectic C orientation having the helical axis uniformly parallel in the film thickness direction and having the helix pitch uniformly equal in the film thickness direction is fixed and by subsequently transferring a desired diffraction pattern to the film.

For example, the liquid crystalline polymer film before the transfer of the diffraction pattern can be formed by applying a liquid crystal onto an alignment film formed on a substrate and by subsequent heat treatment.

As examples of the liquid crystal there are mentioned cholesteric or chiral smectic C liquid crystalline polymers each comprising a liquid crystalline polymer and a predetermined amount of an optically active compound, the liquid crystalline polymer exhibiting a uniform nematic or smectic orientability of monodomain on an alignment substrate and capable of being easily fixed its oriented state, as well as cholesteric or chiral smectic C liquid crystalline polymers exhibiting a uniform cholesteric or chiral smectic C orientability of monodomain and capable of fixed its oriented state easily.

As examples of nematic liquid crystalline polymers and smectic C liquid crystalline polymers there are mentioned such main chain type liquid crystalline polymers as polyesters, polyimides, polyamides, polycarbonates, and polyester-imides, and such side chain type liquid crystalline polymers as polyacrylates, polymethacrylates, polymalonates, and polysiloxanes. Above all, liquid crystalline polyesters are preferred which are superior in orientability and which can be prepared relatively easily. As suitable examples of polymer constituent units are mentioned aromatic or aliphatic diol units, aromatic or aliphatic dicarboxylic acid units, and aromatic or aliphatic hydroxycarboxylic acid units.

As typical examples of an optically active component which is used for imparting a twist to the nematic or smectic C liquid crystalline polymer used and for forming a cholesteric or chiral smectic C orientation, there are mentioned optically active low-molecular compounds or compositions. Any compounds or compositions are employable insofar as they contain an optically active group. But from the standpoint of compatibility with the liquid crystalline polymer used it is desirable that the optically active component be an optically active, liquid crystalline, low-molecular compound or composition.

Optically active, high-molecular compounds or compositions may also be mentioned as examples of the optically active component. Any high-molecular compounds or compositions may be used insofar as they contain an optically active group in the molecules thereof. But from the standpoint of compatibility with the liquid crystalline polymer used it is desirable to use an optically active, liquid crystalline, high-molecular compound or composition. As examples of such liquid crystalline high polymers are mentioned polyacrylates, polymethacrylates, polymalonates, polysiloxanes, polyesters, polyamides, polyester-amides, polycarbonates, polypeptides, and cellulose, as well as compositions containing these liquid crystalline high polymers as principal ingredients. Particularly, optically active, liquid crystalline, aromatic polyesters are preferred.

As examples of liquid crystalline high polymers having an optically active group in the molecules thereof are mentioned those having an optically active group in the main chains thereof, such as polyesters, polyimides, polyamides, polycarbonates, and polyester-imides, as well as those having an optically active group in the side chains thereof, such as polyacrylates, polymethacrylates, polymalonates, and polysiloxanes. Particularly, liquid crystalline polyesters are preferred which are superior in orientability and which can be prepared relatively easily. As suitable examples of polymer constituent units are mentioned aromatic or aliphatic diol units, aromatic or aliphatic dicarboxylic acid units, and aromatic or aliphatic hydroxycarboxylic acid units.

In the present invention, moreover, liquid crystals having a crosslinked structure in the molecules thereof and capable of being rendered high-molecular by crosslinking after the formation of a cholesteric orientation or a chiral smectic C orientation are also included as examples of the liquid crystalline polymer used as the polymer layer. As examples of such liquid crystals are mentioned low-molecular liquid crystals with such functional groups introduced therein as acryloyl, vinyl, and epoxy. Examples of such low-molecular liquid crystals include those which contain, for example, biphenyl derivatives, phenyl benzoate derivatives, or stilbene derivatives as basic structures. Both lyotropic and thermotropic such liquid crystals are employable, but the former is more preferable from the standpoint of working efficiency and process.

Using any of such liquid crystals as described above, a liquid crystalline polymer layer before the transfer thereto of a diffraction pattern can be formed on a substrate. As examples of the substrate are mentioned glass sheet, plastic film, plastic sheet, and polarizing film. As the glass there is used, for example, soda glass, silica-coated soda glass, or borosilicate glass. As a plastic film substrate there may be used, for example, any of films of polymethyl methacrylates, polystyrenes, polycarbonates, polyether sulfones, polyphenylene sulfides, amorphous polyolefins, triacetyl celluloses, polyethylene terephthalates, and polyethylene naphthalates.

As the alignment film, a rubbed polyimide film is suitable, provided those known in this field are also employable. A plastic film or sheet which has been endowed with orientability by direct rubbing without the application of a polyimide for example can also be used as the substrate in the present invention. How to perform the treatment for orientation is not specially limited insofar as cholesteric liquid crystal molecules or chiral smectic C liquid crystal molecules are oriented uniformly in parallel with an orienting interface.

Next, on the substrate or on the alignment film formed on the substrate there is formed a cholesteric or chiral smectic C liquid crystal layer having an appropriate pitch length.

As means for spreding the liquid crystal on the substrate or the alignment film there may be adopted, for example, melt coating or solution coating, but solution coating is preferred in point of process.

In solution coating, the liquid crystal is melted in a solvent at a predetermined ratio to prepare a solution of a predetermined concentration. As the solvent, though different depending on the type of liquid crystal used, there usually may be used, for example, any of such halogenated hydrocarbons as chloroform, dichloroethane, tetrachloroethane, trichloroethylene, tetrachloroethylene, and o-dichlorobenzene, mixtures thereof with phenols, and such polar solvents as ketones, ethers, dimethyl formamide, dimethyl acetamide, dimethyl sulfoxide, N-methylpyrrolidone, sulfolane, and cyclohexane. The concentration of the solution differs depending on the type of liquid crystal used, but is usually in the range of 5 to 50 wt %, preferably 7 to 30 wt %. The solution is applied onto the alignment film or the substrate which has been subjected to an orienting treatment such as rubbing.

As the method for the coating there may be adopted, for example, spin coating, roll coating, die coating, or curtain coating.

After the application of the solution, the solvent is removed by drying and heat treatment is performed at a predetermined temperature for a predetermined period of time to complete a cholesteric orientation or a chiral smectic C orientation. The orientation thus obtained is cooled to a temperature below the glass transition point of the liquid crystal or is irradiated with light, heat, or electron beam to effect crosslinking, whereby the cholesteric or chiral smectic C orientation wherein the helical axis is uniformly parallel in the film thickness direction and the helix pitch is uniformly equal in the film thickness direction, can be fixed as it is.

Various optical parameters, including wavelength band width, film thickness, and the number of twist turns, of the liquid crystalline polymer layer used in the present invention differ depending on, for example, for what purpose the resulting liquid crystalline film is to be used, but it is desirable that the wavelength band width in selective reflection be usually 30 to 150 nm and that the actual thickness of the liquid crystal layer be usually 0.6 to 6 $\mu$m. The wavelength band width in selective reflection indicates a wavelength range in which the reflectance by selective reflection is 70% or more upon incidence of a circularly polarized light in the same direction as the twist direction of the liquid crystal molecules which form the cholesteric or chiral smectic C orientation. If the wavelength bandwidth is outside the above range, the reflected light may be dark despite of the liquid crystal layer itself being bright in color, or vice versa, and visibility may be inferior in some particular application. If the actual thickness of the liquid crystal layer is smaller than 0.6 $\mu$m, the effect of selective reflection by the cholesteric or chiral smectic C orientation may be deteriorated. If the actual layer thickness is larger than 6 $\mu$m, the effect of selective reflection by the said orientation will appear too strong and there is a fear that the diffraction effect, which is a feature of the liquid crystalline film of the present invention, may no longer be confirmed easily. Further, it is desirable that the number of twist turns in the liquid crystalline polymer layer be usually in the range of 2 to 20 turns. If the number of twist turns is smaller than 2 turns, it may be impossible to obtain a satisfactory effect of selective reflection by the cholesteric or chiral smectic C orientation. If the number of twist turns exceeds 20 turns, the effect of selective reflection by the said orientation will appear too strong and it may become impossible to easily confirm the diffraction effect which is a feature of the liquid crystalline film of the present invention.

By transferring a diffraction pattern to the above liquid crystalline polymer film there can be obtained the liquid crystalline film of the present invention.

As a diffraction pattern transferring method there is mentioned, for example, a method wherein a prototype having a diffraction pattern is transferred to the film. As to the prototype having a diffraction pattern, no special limitation is made thereto insofar as there is no fear of the diffraction pattern being impaired under the application of heat and pressure in the pattern transferring operation. As an example there is mentioned a diffraction grating obtained by forming a lattice shape on an aluminum or polymer layer coated on a substrate such as glass, metal, or polymer film. Commercially available ones are mentioned as examples, including a ruled diffraction grating film (a product of Edmond Scientific Japan Co.), a transmission type diffraction grating film, and Ruled Grating (a product of JOBIN YVON Co.). But in the present invention there is made no special limitation thereto.

The transfer of the diffraction pattern is not to be performed in such a manner as to transfer concaves and convexes of the diffraction pattern to only the film surface for example, but it is important to deform the liquid crystal layer structure (the state of orientation) in the interior of the film so that the helical axis is not uniformly parallel in the film thickness direction nor is the helix pitch uniformly equal in the film thickness direction. If the concaves and convexes are transferred to only the film surface, it becomes difficult to attain the effect of the present invention, that is, to form a region of a high diffraction efficiency in the interior of the film. A desired interior deformation by the pattern transfer can be done by using a mechanical method while holding the film under the application of heat and pressure.

The mechanical method indicates the use of a fabrication equipment capable of applying temperature and pressure at a time such as pressing machine, rolling mill, calendering rolls, laminator, or stamper.

The surface having a diffraction pattern and the liquid crystal surface in the liquid crystalline polymer film are fed in a closely contacted state to the fabrication equipment, then are held under predetermined heating and pressurizing conditions for a certain period of time and are cooled to a temperature below the glass transition point of the liquid crystal or are irradiated with light, heat, or electron beam to effect crosslinking. Thereafter, the prototype having the diffraction pattern is peeled off from the liquid crystalline polymer layer. In this way there can be obtained the liquid crystalline film having the unique liquid crystal layer structure according to the present invention.

The temperature in the above heat treatment is usually set within the range of above the glass transition point of the liquid crystal and below the temperature at which an isotropic phase appears. The heating temperature differs depending on the type of equipment used, the type of liquid crystal used, the form of film, and the material of the diffraction pattern prototype, but is usually in the range of 50° to 30° C., preferably 60° to 30° C., more preferably 70° to 200° C., most preferably 90° to 180° C.

The above pressure is set in a range not impairing the liquid crystal surface of the film and the shape of the diffraction pattern prototype. A concrete pressure range is 0.3 to 500 kgf/cm$^2$, preferably 0.5 to 400 kgf/cm$^2$, more preferably 1 to 300 kgf/cm$^2$, most preferably 2 to 200 kgf/cm$^2$.

The duration during which the liquid crystal surface in the liquid crystalline polymer layer and the diffraction pattern are held in close contact under the above heating and pressurizing conditions differ depending on the type of equipment used, the type of liquid crystal used, the form of film, and the material of the diffraction pattern prototype, but is usually not shorter than 0.01 second, preferably in the range of 0.05 second to 30 minutes, more preferably 0.1 second to 15 minutes.

By the above method it is possible to obtain the liquid crystalline film of the present invention. There also may be adopted another method wherein a desired diffraction pattern is transferred beforehand onto such an alignment substrate as referred to above, or the liquid crystal is applied onto the substrate, followed by heat treatment at a predetermined temperature for a predetermined time and subsequent cooling or irradiation with light, heat, or electron beam, thereby allowing crosslinking to take place.

The above manufacturing methods are mere examples, with no limitation being placed on how to prepare the liquid crystalline film of the present invention.

On the liquid crystal surface and/or the diffraction pattern-transferred liquid crystal surface of the liquid crystalline film thus obtained there may be formed an overcoat layer for protecting the said surface. Although the overcoat layer is not specially limited, there may be utilized, for example, a film forming material such as an adhesive which exhibits an isotropic property optically after curing. In case of using an adhesive for the overcoat layer, the overcoat layer can be formed by bonding the liquid crystal surface of the liquid crystalline film or the diffraction pattern-transferred liquid crystal surface to a releasable substrate through the adhesive and by removing the releasable substrate after curing of the adhesive.

The releasable substrate is not specially limited if only it possesses releasability and a self-supporting property. For example, there may be used a plastic film substrate having releasability. By the releasability as referred to herein is meat that the releasable substrate can be released at the interface with the adhesive in a bonded state of the liquid crystalline film and the substrate through the adhesive.

The adhesive is not specially limited if only it can bond the liquid crystalline film and the releasable substrate with each other and permits release of the releasable substrate. Adhesives employable suitably can be classified, according to curing means, into light-curing type, electron beam-curing type, and heat-curing type for example. Particularly, light-curing type and electron beam-curing type adhesives containing an acrylic oligomer as a main component, as well as epoxy resin-based lightcuring type and electron beam-curing type adhesives, are more preferred.

The form of bonding between the liquid crystalline film and the releasable substrate is not specially limited, but generally an adhesive layer is disposed between the film and the substrate. The thickness of the adhesive layer is not specially limited, but is usually in the range of 1 to 30 μm. Additives such as an antioxidant, an ultraviolet ray absorbent, and a hard coating agent may be added to the adhesive as long as they do not affect the effect of the present invention.

The liquid crystalline film of the present invention possesses unique features not found in the conventional liquid crystalline polymer films such that it exhibits a selective reflection phenomenon according to helical pitches for lights in the infrared, visible, and ultraviolet regions, that a diffraction phenomenon is developed by the diffraction pattern formed in the interior of the liquid crystal layer, and that the diffracted light has a circular polarizability. In the liquid crystalline film of the present invention, both diffraction characteristic and polarization characteristic are developed by the orientation structure of the liquid crystal molecules in the interior of the film, so even if the liquid crystalline film is laminated to another optical element through an adhesive free of any difference in refractive index for example, there is no fear that the diffraction characteristic and polarization characteristic of the film may be impaired. Also in the case where an uneven surface based on the diffraction pattern is leveled using the adhesive described above, the liquid crystalline film of the present invention can exhibit both diffraction characteristic and polarization characteristic. The adhesive is not specially limited insofar as there is no refractive index difference in the adhesive layer after curing and the adhesive layer is transparent optically. There may be used any of various conventional known adhesives, including adhesives, pressure-sensitive adhesives, hot melt adhesives, and heat-, light- or electron beam-curing reactive adhesives, with acrylic adhesives being particularly suitable.

The liquid crystalline film of the present invention thus obtained exhibits a unique effect that a diffracted light possesses a circular polarizability which effect is not found in the conventional optical members. Thanks to this effect, if the liquid crystalline film is used in a spectro-optic device which requires polarization such as an ellipsometer, it becomes possible to make the light utilization efficiency extremely high. In the conventional spectro-optic devices requiring polarization, it is necessary that light emitted from a light source be spectralized for each wavelength with use a spectral element such as a diffraction grating or a prism and thereafter be passed through a polarizer, or be first passed through the polarizer and thereafter spectralized. Thus, the use of the polarizer has been essential. The polarizer absorbs about 50% of incident light and the light utilization efficiency is very low. But by using the liquid crystalline film of the present invention it becomes possible to make the light utilization efficiency extremely high, theoretically up to about 100%. With the liquid crystalline film of the invention, the transmission and cut-off of a diffracted light can be controlled easily through an ordinary polarizing plate. Usually, a diffracted light not having polarizability cannot be cut off completely no matter what polarizing plate may be combined with the liquid crystalline film. With the liquid crystalline film of the invention, a diffracted light having a clockwise polarizability can be cut off completely only when using a counterclockwise circular polarizing plate, and even if any other polarizing plate is used, it is impossible to cut off the diffracted light completely. Since the liquid crystalline film of the invention exhibits such an effect, for example when one observes a diffraction image through a polarizing plate, the diffraction image can be emerged suddenly from a dark field or can be suddenly disappeared by changing the state of the polarizing plate.

Thus, the liquid crystalline film of the present invention has an extremely wide application range as a new element having a diffracting function and is employable as various optical elements, opto-electronic element, ornamental element, and forgery preventing element.

As an optical element or an opto-electronic element the liquid crystalline film of the present invention may be used not only as a single layer thereof but also in a laminated state to a transparent and isotropic film as a substrate such as a triacetyl cellulose film, e.g., Fujitack (a product of Fuji Photo Film Co.) or Konicatack (a product of Konica Co.), TPX film (a product of Mitsui Chemical Co.), Arton film (a product of Japan Synthetic Rubber Co.), Zeonex film (a product of Nippon Zeon Co.), or Acryprene film (a product of Mitsubishi Rayon Co.). Thus, the liquid crystalline film of the present invention can be applied to various optical uses. For example, by applying the liquid crystalline film of the invention alone or as a laminate thereof with the above substrate to such liquid crystal displays as TN (twisted nematic)-LCD (Liquid Cyrstal Display), STN (Super Twisted Nematic)-LCD, ECB (Electrically Controlled Birefringence)-LCD, OMI (Optical Mode Interference)-LCD, OCB (Optically Compensated Birefringence)-LCD, HAN (Hybrid Aligned Nematic)-LCD, and IPS (In Plane Switching)-LCD, there can be obtained various LCDs improved in color compensation and/or visual angle. The liquid crystalline film of the present invention is also employable as a spectro-optica element requiring a spectralized polarization as noted above, a polarizing optical element which obtains a specific wavelength by utilizing a diffraction phenomenon, an optical filter, a circular polarizing plate, or a light diffusing plate. Besides, by combining with a quarter-wave plate it is also possible to obtain a linear polarizing plate. Thus, the liquid crystalline film of the invention, as an optical element or as an opto-electronic element, can afford various optical members capable of exhibiting such an optical effect as has heretofore been unattainable.

As an ornamental element the liquid crystalline film of the invention can afford various ornamental molding materials, including novel design films which exhibit both rainbow color presenting effect based on a diffracting ability and a bright color presenting effect based on chiral smectic C liquid crystal. Moreover, since the liquid crystalline film of the invention can be made very thin, a great contribution thereof to the distinction from other similar products can be expected by, for example, affixing the film to existing products or by making it integral with existing products. For example, if an ornamental diffraction pattern is incorporated in the liquid crystalline film of the invention and the film with such pattern incorporated therein is affixed to a glass window or the like, the selective reflection peculiar to the cholesteric or chiral smectic C liquid crystal in the presence of the diffraction pattern creates a look of different colors depending on the visual angle from the exterior, and thus film is superior in fashionability. The window with the liquid crystalline film affixed thereto is difficult to see its interior from the exterior which is bright, but nevertheless provides a good exterior visibility from the interior.

As a forgery preventing element the liquid crystalline film of the invention can be used as a new forgery preventing film, seal, or label having the forgery preventing effects of both diffraction element and liquid crystal. For example, the liquid crystalline film of the invention can be affixed or embedded to or woven into card substrates or mounts such as driver's license, identification card, passport, credit card, prepaid card, various money-substitute coupons, gift cards, and securities. The liquid crystalline film of the invention has a region which exhibits a diffracting ability, i.e., a diffraction pattern, in part of the liquid crystal layer and it possesses such effects as wavelength selective reflectivity, circular polarization selective reflectivity, visual angle dependence of color, and presentation of a beautiful color, of the cholesteric or chiral smectic C liquid crystal. Thus, if the liquid crystalline film of the invention is used as an anti-forgery element, the forgery of the film is extremely difficult. In addition to such a forgery preventing effect, the liquid crystalline film of the invention also possesses a characteristic that the helical axis is not uniformly parallel in the film thickness direction and the helix pitch is not uniformly equal in the film thickness direction; that is, the film exhibits a rainbow color presenting effect based on the diffracting ability and a bright color presenting effect of the cholesteric or chiral smectic C liquid crystal. The liquid crystalline film of the invention is thus superior also in point of design. Now it should be readily seen that the liquid crystalline film of the invention is very useful as an anti-forgery element.

These are only limited examples of use. The liquid crystalline film of the invention is applicable to various conventional uses wherein diffraction elements or liquid crystalline films are used each alone, and can exhibit a new optical effect. Thus, the liquid crystalline film of the invention is also applicable to various other uses than those described above.

EXAMPLES

Working examples of the present invention will be given below, but it is to be understood that the liquid crystalline film of the invention is not limited thereto.

Reference Example 1

A liquid crystalline polyester composition containing an R-form optically active compound and having a glass transition temperature of 80° C. was formed into a film by spin coating on a triacetate film having a rubbed polyimide layer, followed by heat treatment at 135° C. for 5 minutes, to afford a film having a green specular reflection characteristic. From a polarizing microscope observation and a TEM observation for a section of the film it was confirmed that the helical axis in cholesteric phase was uniformly parallel in the film thickness direction and that the helix pitch was uniformly equal in the film thickness direction. Also, it turned out that an actual thickness of a liquid crystal layer was 4.8 $\mu$m and that the number of twist turns of liquid crystal molecules was about 15.

The film thus obtained was then measured for transmission spectrum by means of an ultraviolet, visible, infrared spectrophotometer V-570 (a product of Nippon Bunko Co.) to find that there was formed a cholesteric liquid crystal layer exhibiting a selective reflection with a selective reflection wavelength band width $\Delta\lambda$ of about 90 nm at a central wavelength $\lambda s$ of about 550 nm.

Reference Example 2

A liquid crystalline polyester composition containing an S-form optically active compound and having a glass transition temperature of 80° C. was formed into a film by spin coating on a triacetyl cellulose film having a rubbed polyimide layer, followed by heat treatment at 140° C. for 5 minutes, to afford a film having a green specular reflection characteristic. From a polarizing microscope observation and a TEM observation for a section of the film it was confirmed that the helical axis in cholesteric phase was uniformly parallel in the film thickness direction and that the helix pitch was uniformly equal in the film thickness direction. Also, it turned out that an actual thickness of a liquid crystal layer was 5.5 μm and that the number of twist turns of liquid crystal molecules was about 17.

The film thus obtained was then measured for transmission spectrum by means of an ultraviolet, visible, infrared spectrophotometer V-570 (a product of Nippon Bunko Co.) to find that there was formed a cholesteric liquid crystal layer exhibiting a selective reflection with a selective reflection wavelength band width Δλ of about 90 nm at a central wavelength λs of about 550 nm.

Reference Example 3

A liquid crystalline polyester composition containing an R-form optically active compound and having a glass transition temperature of 77° C. was formed into a film by spin coating on a triacetyl cellulose film having a rubbed polyimide layer, followed by heat treatment at 130° C. for 5 minutes, to afford a film having a blue specular reflection characteristic. From a polarizing microscope observation and a TEM observation for a section of the film it was confirmed that the helical axis in chiral smectic C phase was uniformly parallel in the film thickness direction and that the helix pitch was uniformly equal in the film thickness direction. Also, it turned out that an actual thickness of a liquid crystal layer was 1.2 μm and that the number of twist turns of liquid crystal molecules was about 3.5.

The film thus obtained was then measured for transmission spectrum by means of an ultraviolet, visible, infrared spectrophotometer V-570 (a product of Nippon Bunko Co.). As a result, there was confirmed a selective reflection with a selective reflection wavelength band width Δλ of about 50 nm at a central wavelength λs of about 500 nm. Further, the film was measured for transmission spectrum in a 30° tilted state of the film. As a result, a selective reflection corresponding to a full-pitch band was confirmed at a central wavelength λs of about 920 nm. Thus, it turned out that there was formed a chiral smectic C liquid crystal phase.

Reference Example 4

A liquid crystalline polyester composition containing an S-form optically active compound and having a glass transition temperature of 77° C. was formed into a film by spin coating on a triacetyl cellulose film having a rubbed polyimide layer, followed by heat treatment at 130° C. for 10 minutes, to afford a film exhibiting a blue specular reflection. From a polarizing microscope observation and a TEM observation for a section of the film it was confirmed that the helical axis in chiral smectic C phase was uniformly parallel in the film thickness direction and that the helix pitch was uniformly equal in the film thickness direction. Also, it turned out that an actual thickness of a liquid crystal layer was 2.5 μm and that the number of twist turns of liquid crystal molecules was about 7.

The film thus obtained was then measured for transmission spectrum by means of an ultraviolet, visible, infrared spectrophotometer V-570 (a product of Nippon Bunko Co.). As a result, there was confirmed a selective reflection with a selective reflection wavelength band width Δλ of about 50 nm at a central wavelength λs of about 500 nm. The film was further measured for transmission spectrum in a 30° tilted state. As a result, a selective reflection corresponding to a full-pitch band at a central wavelength λs of about 920 nm. Thus, it turned out that there was formed a chiral smectic C liquid crystal phase.

Reference Example 5

A liquid crystalline polyester composition containing an R-form optically active compound and having a glass transition temperature of 120° C. was formed into a film by spin coating on a triacetate film having a rubbed polyimide layer, followed by heat treatment at 150° C. for 5 minutes, to afford a film having a gold specular reflection characteristic. From a polarizing microscope observation and a TEM observation for a section of the film it was confirmed that the helical axis in cholesteric liquid crystal phase was uniformly parallel in the film thickness direction and that the helix pitch was uniformly equal in the film thickness direction.

The film thus obtained was measured for transmission spectrum by means of an ultraviolet, visible, infrared spectrophotometer V-570 (a product of Nippon Bunko Co.) to find that there was formed a cholesteric liquid crystal layer exhibiting a selective reflection with a selective reflection wavelength band width Δλ of about 100 nm at a central wavelength λs of about 600 nm. Also, it turned out that an actual thickness of the liquid crystal layer was 4.8 μm and that the number of twist turns of liquid crystal molecules was about 15.

Reference Example 6

An acrylic cholesteric liquid crystalline compound having an R-form optically active group was formed into a film by spin coating on a polyethylene naphthalate film having a rubbed polyimide layer, followed by heat treatment at 140° C. for 5 minutes, to afford a film having a gold specular reflection characteristic. The film was then irradiated with ultraviolet light in a nitrogen atmosphere. As a result, there was obtained a film having a cholesteric orientation with a glass transition temperature of 150° C. From a polarizing microscope observation and a TEM observation for a section of the film it was confirmed that the helical axis in cholesteric liquid crystal phase was uniformly parallel in the film thickness direction and that the helix pitch was uniformly equal in the film thickness direction.

The film thus obtained was then measured for transmission spectrum by means of an ultraviolet, visible, infrared spectrophotometer V-570 (a product of Nippon Bunko Co.) to find that there was formed a cholesteric liquid crystal layer exhibiting a selective reflection with a selective reflection wavelength band width Δλ of about 100 nm at a central wavelength λs of about 610 nm. Also, it turned out that an actual thickness of the liquid crystal layer was 4.8 μm and that the number of twist turns of liquid crystal molecules was about 15.

Example 1

A ruled diffraction grating film (900 lines/mm) (a product of Edmond Scientific Japan Co.) and the liquid crystalline polymer film obtained in Reference Example 1 were superimposed together in such a manner that a diffractive surface of the ruled diffraction grating film and a liquid crystal layer surface of the liquid crystalline polymer film confronted each other, and then were pressurized on a hot plate heated to about 100° C., at a pressure of about 15 kg/cm², using a rubber roller. Next, the ruled diffraction grating film was removed and an overcoat layer (thickness: about 5 μm) was formed using an acrylic overcoating agent (refractive index: 1.53) onto the liquid crystal layer surface with which the diffraction grating film had been contacted, to level an uneven surface formed on the liquid crystal layer surface.

The liquid crystalline film thus obtained was then subjected to polarizing microscope observation and TEM observation for a section of the film to find that there was formed a cholesteric orientation in the film surface region wherein the helical axis in cholesteric phase was not uniformly parallel nor was the helix pitch uniformly equal in the film thickness direction.

Next, He-Ne laser beam (wavelength: 632.8 nm) was introduced perpendicularly into the surface of the liquid crystalline film thus obtained. As a result, the laser beam was observed at exit angles of 0° and about ±35°. Thus, it turned out that a region (a film surface region) functioning as a diffraction grating was formed in the interior of the liquid crystalline film.

Then, for checking polarization characteristics, the liquid crystalline film was placed under an ordinary interior illumination and was observed through a clockwise circularly polarizing plate (transmitting only a clockwise circularly polarized light). As a result, a reflected/diffracted light of rainbow color was observed and there was obtained substantially the same brightness as that observed without the polarizing plate. On the other hand, when the liquid crystalline film was observed through a counterclockwise circularly polarizing plate (transmitting only a counterclockwise circularly polarized light), a dark field was obtained and a reflected/diffracted light of rainbow color was not observed. From these observations the diffracted light obtained by using the liquid crystalline film was found to be a clockwise circularly polarized light. Thus, it turned out that a clockwise circularly polarized diffracted light was obtained by the liquid crystalline film.

Example 2

A ruled diffraction grating film (900 lines/mm) (a product of Edmond Scientific Japan Co.) and the liquid crystlline polymer film obtained in Reference Example 2 were superimposed together in such a manner that a diffractive surface of the ruled diffraction grating film and a liquid crystal layer surface of the liquid crystalline polymer film confronted each other, and then were pressurized on a hot plate heated to about 100° C., at a pressure of about 15 kg/cm$^2$, using a rubber roller. Next, the ruled diffraction grating film was removed and an overcoat layer (thickness: about 5 μm) was formed using an acrylic overcoating agent (refractive index: 1.53) onto the liquid crystal layer surface with which the diffracting grating film had been contacted, to level an uneven surface formed on the liquid crystal layer surface.

The liquid crystalline film thus obtained was then subjected to polarizing microscope observation and TEM observation for a section of the film to find that there was formed a cholesteric orientation in the film surface region wherein the helical axis in cholesteric phase was not uniformly parallel nor was the helix pitch uniformly equal in the film thickness direction.

Then, He-Ne laser beam (wavelength: 632.8 nm) was introduced into the surface of the liquid crystalline film thus obtained. As a result, the laser beam was observed at exit angles of 0° and about ±35°. Thus, it turned out that a region (a film surface region) functioning as a diffraction grating was formed in the interior of the liquid crystalline film.

Next, for checking polrization characteristics, the liquid crystalline film was placed under an ordinary interior illumination and was observed through a counterclockwise circularly polarizing plate (transmitting only a counterclockwise circularly polarized light). As a result, a reflected/diffracted light of rainbow color was observed and there was obtained substantially the same brightness as that observed without the polarizing plate. On the other hand, when the liquid crystalline film was observed through a clockwise circularly polarizing plate (transmitting only a clockwise circularly polarized light), a dark field was obtained and a reflected/diffracted light of rainbow color was not observed. From these observations the diffracted light obtained by using the liquid crystalline film was found to be a counterclockwise circularly polarized light. Thus, it turned out that a counterclockwise circularly polarized diffracted light was obtained by the liquid crystalline film.

Example 3

A uniaxially stretched film (formed of a polyvinyl alcohol, retardation: 140 nm, a product of Polatechno Co.) was laminated as a quarter-wave plate onto the liquid crystalline film obtained in Example 11, through an acrylic adhesive, to afford a laminate.

A polarizing plate HLC2-5518 (a product of Sanritz Co.) was superimposed on the quarter-wave plate side of the laminate thus obtained and observation was made. As a result, a dark field was obtained at an angle of 45° between a retardation axis of the quarter-wave plate and an absorption axis of the polarizing plate, while a bright field was obtained at an angle of 45° between the retardation axis of the quarter-wave plate and a transmission axis of the polarizing plate, and a selectively reflected green light from the liquid crystalline film was observed. Upon irradiation of a halogen light there was observed a diffracted light of rainbow color.

Thus, it turned out that the diffracted light obtained by using the laminate of the liquid crystalline film formed in Example 1 and the quarter-wave plate was a linearly polarized light and that the said laminate functions as a linearly polarized light diffraction grating.

Example 4

A ruled diffraction grating film (900 lines/mm) (a product of Edmond Scientific Japan Co.) and the liquid crystalline polymer film obtained in Reference Example 3 were superimposed together in such a manner that a diffractive surface of the ruled diffraction grating film and a liquid crystal layer surface of the liquid crystalline polymer film confronted each other, and then were pressurized on a hot plate heated to about 90° C., at a pressure of about 20 kg/cm$^2$, using a rubber roller. Next, the ruled diffraction grating film was removed and an overcoat layer (thickness: about 5 μm) was formed using an acrylic overcoating agent (refractive index: 1.53) onto the liquid crystal layer surface with which the diffraction grating film had been in contact, to level an uneven surface formed on the liquid crystal layer surface.

The liquid crystalline film thus obtained was then subjected to polarizing microscope observation and TEM observation for a section of the film to find that there was formed cholesteric orientation in the film surface region wherein the helical axis in cholesteric phase was not uniformly parallel nor was the helix pitch uniformly equal in the film thickness direction.

Next, He-Ne laser beam (wavelength: 632.8 nm) was introduced perpendicularly into the surface of the liquid crystalline film thus obtained. As a result, the laser beam was observed at exit angles of 0° and about ±35°. Thus, it turned out that a region (a film surface region) functioning as a diffraction grating was formed in the interior of the liquid crystalline film.

Then, for checking polarization characteristics, the liquid crystalline film was placed under an ordinary in interior illumination and was observed through a clockwise circularly polarizing plate (transmitting only a clockwise circularly polarized light). As a result, a reflected/diffracted light of rainbow color was observed and there was obtained substantially the same brightness as that observed without the polarizing plate. On the other hand, when the liquid crystalline film was observed through a counterclockwise circularly polarizing plate (transmitting only a counterclockwise circularly polarized light), a dark field was obtained and a reflected/diffracted light of rainbow color was not observed. From these observations the diffracted light obtained by using the liquid crystalline film was found to be a clockwise circularly polarized light. Thus, it turned out that a clockwise circularly polarized diffracted light was obtained by the liquid crystalline film.

Example 5

A ruled diffraction grating film (900 lines/mm) (a product of Edmond Scientific Japan Co.) and the liquid crystalline polymer film obtained in Reference Example 4 were superimposed together in such a manner that a diffractive surface of the ruled diffraction grating film and a liquid crystal layer surface of the liquid crystalline polymer film confronted each other, and then were pressurized on a hot plate heated to about 90° C., at a pressure of about 20 kg/cm$^2$, using a rubber roller. Next, the ruled diffraction grating film was removed and an overcoat layer (thickness: about 5 μm) was formed using an acrylic overcoating agent (refractive index: 1.53) onto the liquid crystal layer surface with which the diffraction grating film had been in contact, to level an uneven surface formed on the liquid crystal layer surface.

The liquid crystalline film thus obtained was then subjected to polarizing microscope observation and TEM observation for a section of the film to find that there was formed a cholesteric orientation in the film surface region wherein the helical axis in cholesteric phase was not uniformly parallel nor was the helix pitch uniformly equal in the film thickness direction.

Next, He-Ne laser beam (wavelength: 632.8 nm) was introduced perpendicularly into the surface of the liquid crystalline film thus obtained. As a result, the laser beam was observed at exit angles of 0° and about ±35°. Thus, it turned out that a region (a film surface region) functioning as a diffraction grating was formed in the interior of the liquid crystalline film.

Then, for checking polarization characteristics, the liquid crystalline film was placed under an ordinary interior illumination and was observed through a counterclockwise circularly polarizing plate (transmitting only a counterclockwise circularly polarized light. As a result, a reflected/diffracted light of rainbow color was observed and there was obtained substantially the same brightness as that observed without the polarizing plate. On the other hand, when the liquid crystalline film was observed through a clockwise polarizing plate (transmitting only a clockwise circularly polarized light), a dark field was obtained and a reflected/diffracted light of rainbow color was not observed. From these observations the diffracted light obtained by using the liquid crystalline film was found to be a counterclockwise circularly polarized light. Thus, it turned out that a counterclockwise circularly polarized diffracted light was obtained by the liquid crystalline film.

Example 6

A ruled diffraction grating film (900 lines/mm) (a product of Edmond Scientific Japan Co.) and the liquid crystalline polymer film obtained in Reference Example 1 were superimposed together in such a manner that a diffractive surface of the ruled diffraction grating film and a liquid crystal layer surface of the liquid crystalline polymer film confronted each other, then were placed on a plate of a 26-ton press (a product of Shinei Sangyo Co.), then heated and pressed under the conditions of 100° C., 100 kg/cm$^2$, and held for 5 minutes. The laminate thus heat-pressed was taken out from the press and cooled to room temperature. Thereafter, the ruled diffraction grating film was removed and an overcoat layer (thickness: about 5 μm) was formed using an acrylic overcoating agent (refractive index: 1.53) onto the liquid crystal layer surface with which the diffraction grating film had been in contact, to level an uneven surface formed on the liquid crystal layer surface.

The liquid crystalline film thus obtained was then subjected to polarizing microscope observation and TEM observation for a section of the film to find that there was formed a cholesteric orientation in the film surface region wherein the helical axis in cholesteric phase was not uniformly parallel nor was the helix pitch uniformly equal in the film thickness direction.

Next, He-Ne laser beam (wavelength: 632.8 nm) was introduced perpendicularly into the surface of the liquid crystalline film thus obtained. As a result, the laser beam was observed at exit angles of 0° and about ±35°. Thus, it turned out that a region functioning as a diffraction grating was formed in the interior of the liquid crystalline film.

Then, for checking polarization characteristics, the liquid crystalline film was placed under an ordinary interior illumination and was observed through a clockwise circularly polarizing plate (transmitting only a clockwise circularly polarized light). As a result, a reflected/diffracted light of rainbow color was observed and there was obtained substantially the same brightness as that observed without the polarizing plate. On the other hand, when the liquid crystalline film was observed through a counterclockwise circularly polarizing plate (transmitting only a counterclockwise circularly polarized light), a dark field was obtained and a reflected/diffracted light of rainbow color was not observed. From these observations the diffracted light obtained by using the liquid crystalline film was found to be a clockwise circularly polarized light.

Comparative Example 1

A ruled diffraction grating film (900 lines/mm) (a product of Edmond Scientific Japan Co.) and the liquid crystalline polymer film obtained in Reference Example 1 were superimposed together in such a manner that a diffractive surface of the ruled diffraction grating film and a liquid crystal layer surface of the liquid crystalline polymer film confronted each other, then were placed on a plate of a 26-ton press (a product of Shinei Sangyo Co.), then heated and pressed at a temperature of below the glass transition point of the liquid crystal used in Reference Example 1 and at a pressure of 100 kg/cm$^2$, and held for 5 minutes. The laminate thus heat-pressed was taken out from the press and cooled to room temperature. Thereafter, the ruled diffraction grating film was removed.

Subsequently, the liquid crystalline polymer film was subjected to polarizing microscope observation and TEM observation for a section of the film to find that there was no change in the cholesteric orientation, that is, the helical axis in cholesteric phase was uniformly parallel and the helix pitch was uniformly equal in the film thickness direction.

Comparative Example 2

A ruled diffraction grating film (900 lines/mm) (a product of Edmond Scientific Japan Co.) and the liquid crystalline polymer film obtained in Reference Example 1 were superimposed together in such a manner that a diffractive surface of the ruled diffraction grating film and a liquid crystal layer surface of the liquid crystalline polymer film confronted each other, then were placed on a plate of a 26-ton press (a product of Shinei Sangyo Co.), then heated and pressed at a temperature of above the isotropic phase transition temperature of the liquid crystalline polymer used in Reference Example 1 and at a pressure of 100 kg/cm$^2$, and held for 5 minutes. The laminates thus heat-pressed was taken out from the press and cooled to room temperature. Thereafter, the ruled diffraction grating film was removed. The resulting film exhibited a change into an isotropic phase present in a higher temperature zone than the cholesteric phase.

Example 7

A ruled diffraction grating film (900 lines/mm) (a product of Edmond Scientific Japan Co.) and the liquid crystalline polymer film obtained in Reference Example 5 were superimposed together in such a manner that a diffractive surface of the ruled diffraction grating film and a liquid crystal layer surface of the liquid crystalline polymer film confronted each other, then heated and pressed under the conditions of 135° C., 3 kg/cm$^2$, and a roll contact time of 0.5 second, using a laminator DX-350 (a product of Tokyo Laminex Co.), followed by cooling to room temperature and subsequent removal of the ruled diffraction grating film.

The film with the diffraction grating film thus removed was then subjected to polarizing microscope observation and TEM observation for a section of the film to find that there was formed a cholesteric orientation in the film surface region wherein the helical axis in cholesteric phase was not uniformly parallel nor was the helix pitch uniformly equal in the film thickness direction. In the other region than the surface region it turned out that the helicdal axis in cholesteric phase was uniformly parallel in the film thickness direction and that the helix pitch was uniformly equal in the film thickness direction. Next, an overcoat layer (thickness: about 5 μm) was formed using an acrylic overcoating agent (refractive index: 1.53) onto the liquid crystal layer surface with which the diffraction grating film had been in contact, to level an uneven surface formed on the liquid crystal layer surface.

The liquid crystalline film thus obtained was also subjected to polarizing microscope observation and TEM observation for a section of the film to find that there was formed a cholesteric orientation in the film surface region wherein the helical axis in cholesteric phase was not uniformly parallel in the film thickness direction nor was the helix pitch uniformly equal in the film thickness direction.

Next, He-Ne laser beam (wavelength: 632.8 nm) was introduced perpendicularly into the surface of the liquid crystalline film. As a result, the laser beam was observed at exit angles of 0° and about ±35°. Thus, it turned out that a region (a film surface region) functioning as a diffraction grating was formed in the interior of the liquid crystalline film.

Then, for checking polarization characteristics, the liquid crystalline film was placed under an ordinary interior illumination and was observed through a clockwise circularly polarizing plate (transmitting only a clockwise circularly polarized light). As a result, a reflected/diffracted light of rainbow color was observed and there was obtained substantially the same brightness as that observed without the polarizing plate. On the other hand, when the liquid crystalline film was observed through a counterclockwise circularly polarizing plate (transmitting only a counterclockwise circularly polarized light), a dark field was obtained and a reflected/diffracted light of rainbow color was not observed. From these observations the diffracted light obtained by using the liquid crystalline film was found to be a clockwise circularly polarized light.

Example 8

A ruled diffraction grating film (900 lines/mm) (a product of Edmond Scientific Japan Co.) and the liquid crystalline polymer film obtained in Reference Example 6 were superimposed together in such a manner that a diffractive surface of the ruled diffraction grating film and a liquid crystal layer surface of the liquid crystalline polymer film confronted each other, then were heated and pressed under the conditions of 170° C., 20 kg/cm$^2$, and a roll contact time of 1 second, using a rolling mill (a product of Hitachi Machine Engineering Co.), followed by cooling to room temperature and subsequent removal of the ruled diffraction grating film.

The film with the diffraction grating film removed was subjected to polarizing microscope observation and TEM observation for a section of the film to find that there was formed a cholesteric orientation in the film surface region wherein the helical axis in cholesteric phase was not uniformly parallel nor was the helix pitch uniformly equal in the film thickness direction. In the other region than the surface region it turned out that there was formed a cholesteric orientation wherein the helix axis in cholesteric phase was uniformly parallel in the film thickness direction and the helix pitch was uniformly equal in the film thickness direction.

Next, an overcoat layer (thickness: about 5 μm) was formed using an acrylic overcoating agent onto the liquid crystal layer surface with which the diffraction grating film had been in contact, to level an uneven surface formed on the liquid crystal layer surface.

The liquid crystalline film thus obtained was also subjected to polarizing microscope observation and TEM observation for a section of the film to find that there was formed a cholesteric orientation in the film surface region wherein the helical axis in cholesteric phase was not uniformly parallel in the film thickness direction nor was the helix pitch uniformly equal in the film thickness direction.

Then, He-Ne laser beam (wavelength: 632.8 nm) was introduced perpendicularly into the film surface. As a result, the laser beam was observed at exit angles of 0° and about ±35°. Thus, it turned out that a region (a film surface region) functioning as a diffraction grating was formed in the interior of the liquid crystalline film.

Then, for checking polarization characteristics, the liquid crystalline film was placed under an ordinary interior illumination and was observed through a clockwise circularly polarizing plate (transmitting only a clockwise circularly polarized light). As a result, a reflected/diffracted light of rainbow color was observed and there was obtained substantially the same brightness as that observed without the polarizing plate. On the other hand,when the liquid crystalline film was observed through a counterclockwise circularly polarizing plate (transmitting only a counterclockwise circularly polarized light), a dark field was obtained and a reflected/diffracted light of rainbow color was not observed. From these observations the diffracted light obtained by using the liquid crystalline film was found to be a clockwise circularly polarized light.

What is claimed is:

1. A liquid crystalline film in which a cholesteric orientation or a chiral smectic C orientation, in which the helical axis is not uniformly parallel in the film thickness direction nor is the helix pitch uniformly equal in the film thickness direction, is formed in a certain region of the film.

2. The liquid crystalline film of claim 1, wherein said cholesteric orientation or chiral smectic C orientation is formed in a surface region of the film and/or an interior region of the film.

3. A process for fabricating the liquid crystalline film described in claim 1, wherein a diffraction pattern is transferred to a liquid crystal layer to obtain the liquid crystalline film.

4. The process of claim 3, wherein the liquid crystal layer is a liquid crystalline polymer layer.

5. The process of claim 4, wherein the diffraction pattern is transferred to said liquid crystalline polymer layer in a temperature range of above a glass transition point of the liquid crystal and below an isotropic phase transition temperature of the liquid crystal and in a pressure range of 0.3 to 500 kgf/cm$^2$.

6. An optical element characterized in that the liquid crystalline film described in claim 1 is laminated to an optical member through an adhesive free of any difference in refractive index.

7. An optical element obtained by transferring a diffraction pattern to a surface of a liquid crystal layer in the liquid crystalline film described in claim 1 to make said surface uneven in accordance with the diffraction pattern and by subsequently leveling the uneven surface with use of an adhesive free of any difference in refractive index.

* * * * *